(12) United States Patent
Alvarez (10) Patent No.: US 10,835,353 B2
(45) Date of Patent: Nov. 17, 2020

(54) METHOD FOR ANALYZING A POSITIONAL RELATIONSHIP BETWEEN A DENTAL RESTORATION AND A DENTAL SUBSTRUCTURE

(71) Applicant: 3M INNOVATIVE PROPERTIES COMPANY, St. Paul, MN (US)

(72) Inventor: Alberto Alvarez, Madrid (ES)

(73) Assignee: 3M Innovative Properties Company, St. Paul, MN (US)

( * ) Notice: Subject to any disclaimer, the term of this patent is extended or adjusted under 35 U.S.C. 154(b) by 49 days.

(21) Appl. No.: 15/409,942

(22) PCT Filed: Jul. 28, 2015

(86) PCT No.: PCT/US2015/042338
§ 371 (c)(1),
(2) Date: Jan. 19, 2017

(87) PCT Pub. No.: WO2016/018838
PCT Pub. Date: Feb. 4, 2016

(65) Prior Publication Data
US 2017/0172713 A1   Jun. 22, 2017

(30) Foreign Application Priority Data

Jul. 29, 2014 (EP) .................................. 14178922

(51) Int. Cl.
*A61C 13/00* (2006.01)
*A61C 9/00* (2006.01)
(Continued)

(52) U.S. Cl.
CPC ............ *A61C 13/0004* (2013.01); *A61C 5/77* (2017.02); *A61C 8/0001* (2013.01);
(Continued)

(58) Field of Classification Search
CPC . A61C 13/0004; A61C 9/0046; A61C 9/0053; A61C 5/77; A61C 13/0006; A61C 13/0024
See application file for complete search history.

(56) References Cited

U.S. PATENT DOCUMENTS

| | | | | |
|---|---|---|---|---|
| 5,538,424 A | * | 7/1996 | Gelb | ...................... A61C 1/084 378/163 |
| 2009/0133260 A1 | * | 5/2009 | Durbin | ............... A61C 13/0004 29/896.11 |

(Continued)

OTHER PUBLICATIONS

International Search Report for PCT International Application No. PCT/US2015/042338 dated Sep. 4, 2015, 3 pages.

*Primary Examiner* — Edward Moran (57) ABSTRACT

A method of analyzing a positional relationship between a dental restoration and a dental substructure. The method has steps of scanning a reference area and determining the shape of the dental substructure in its positional relationship to the reference area, and thereby providing a virtual dental substructure model and scanning the reference area along with scanning at least a portion of the dental restoration in fit position with the dental substructure to provide a virtual assembly model. The method further has the step of providing fitting quality information between the dental restoration model and the dental substructure model. The method utilizes superposing of further virtual models to provide the fitting quality information. The method facilitates the assessment of the quality of the fit between a dental restoration and a dental substructure.

11 Claims, 6 Drawing Sheets

(51) Int. Cl.
*A61C 5/77* (2017.01)
*A61C 8/00* (2006.01)
*A61C 13/34* (2006.01)

(52) U.S. Cl.
CPC .......... *A61C 8/0048* (2013.01); *A61C 9/0046* (2013.01); *A61C 13/34* (2013.01)

(56) References Cited

U.S. PATENT DOCUMENTS

| | | |
|---|---|---|
| 2010/0105011 A1 | 4/2010 | Karkar |
| 2011/0008751 A1 | 1/2011 | Pettersson |
| 2013/0189646 A1* | 7/2013 | Hochman ............ A61C 8/0001 433/174 |
| 2013/0209965 A1 | 8/2013 | Fisker |
| 2014/0335470 A1* | 11/2014 | Fisker ................ A61C 13/0004 433/29 |

* cited by examiner

METHOD FOR ANALYZING A POSITIONAL RELATIONSHIP BETWEEN A DENTAL RESTORATION AND A DENTAL SUBSTRUCTURE

FIELD OF THE INVENTION

The invention relates to method of analyzing a positional relationship between a dental restoration and a dental substructure.

BACKGROUND ART

Dental restorations are often prepared based on computerized procedures including, for example, computer aided design and computer aided manufacturing. Although such procedures provide dental restorations at an excellent accuracy level the quality of the fit of a dental restoration in a patient's mouth depends on further factors, for example the quality of the dental substructure in a patient's mouth to which the dental restoration is to be affixed. Such a dental substructure includes for example one or more dental implants, dental abutments, natural tooth stumps or combinations thereof.

The dental restoration is typically manufactured based on a model of a patient's dentition at a first stage, and that dental restoration is inserted in the patent's dentition at a later second stage. Such a model may be a physical model, for example a dental impression, or a virtual model, for example a dataset obtained from scanning the patient's dentition. Further the dental practitioner normally has limited capability of assessing the fit between the dental substructure and the dental restoration. In particular in cases in which the margin between the dental substructure and the dental restoration lies partly or entirely beyond boundaries of the patient's gums the dental practitioner basically has no possibility to assess the fit by help of a visual inspection because the relevant area of that fit is hidden. In case the situation in the patient's mouth has changed between the first and second stage, or if any tolerances during preparation of the model or manufacturing of the dental restoration have occurred, it may be difficult or impossible for the dental practitioner to recognize any poor fit. Even slight defects in the fit may result in gaps between the dental restoration and the substructure and in the risk of bacteria to penetrate into that gap.

Therefore there is a need for means which help improving the quality of the fit between the dental restoration and the dental substructure.

SUMMARY OF THE INVENTION

The invention in one aspect relates to a method of analyzing a positional relationship between a dental restoration and a dental substructure which is prepared for receiving the dental restoration. The method comprises the steps of:
  scanning a reference area and determining the shape of at least a portion of the dental substructure in its positional relationship to the reference area, and thereby providing a virtual dental substructure model;
  scanning the reference area along with scanning at least a portion of the dental restoration in fit position with the dental substructure to provide a virtual assembly model;
  providing the shape of at least part of an inner surface and the shape of at least part of an outer surface of the dental restoration in the form of a virtual inner surface model and a virtual outer surface model, respectively; wherein the inner surface relates to a surface for fitting with the dental substructure;
  superposing the dental substructure model and the assembly model based on the reference area;
  superposing the inner surface model and the outer surface model (or the dental restoration model) with the assembly model; and
  providing fitting quality information based on a positional relationship between the inner surface model (or the dental restoration model) and the dental substructure model.

The invention is advantageous in that it enables a dental practitioner assessing the quality of an actual fit between a dental substructure and a dental restoration. The invention further allows such an assessment chair-side, for example in a dental practice. This is because the invention allows a dental practitioner to gather all geometric information about the dental substructure and the dental restoration, which is needed for the assessment, from a substructure in a patient's mouth and a finished or pre-finished dental restoration. Further the invention is advantageous in that it helps avoiding any use of poor fitting dental restorations. The invention is also advantageous in that it can be used with both, manually manufactured dental restorations and dental restorations that are manufactured with the aid of a computer. The invention is advantageous in that it helps detecting and measuring potential physical deformation of the dental restoration, enabling a further tensional analysis. This is possible because the dental restoration may be scanned extra-orally and intra-orally and the scans can be compared or matched with each other. The dental restoration scanned extra-orally is free of any tension eventually resulting from an assembly with the dental substructure, whereas the same dental restoration scanned fitted in the mouth may eventually exposed to tensions from a poor fit with the dental substructure. In this way, the physical deformations in the dental restoration are detectable, locatable and measurable. The presence of tension in the dental restoration is considered as a high risk factor for future complications (cracks in dental restoration, bacteria penetration and infections, for example) in implant restorations. The present invention helps identifying any poor fitting between the dental restoration and the dental substructure and thus helps to minimize such risks.

In one embodiment the shape of at least part of an inner surface and the shape of at least part of an outer surface of the dental restoration are provided by scanning the dental restoration. Although a virtual model of that dental restoration may exist in case that dental restoration is manufactured based on a computer aided design, that virtual model is typically not available (or not in the required data format) to the dental practitioner who uses the dental restoration for the patient. Further, in case a manually prepared or finished dental restoration is used, no such virtual model would typically exist. With the step of scanning the finished or prefinished dental restoration the advance availability of such a virtual model is obsolete.

In a further embodiment the shape of the at least a portion of the dental substructure is determined by scanning the portion of the dental substructure. The portion of the dental substructure may be scanned to the extent that portion visibly protrudes over a patient's gums. Further the shape of the at least a portion of the dental substructure may be determined by scanning a scan body which is detachably attached to the dental substructure and by retrieving a virtual model of the dental substructure from a library. Such a library may hold a plurality of different virtual standard implant models from which a corresponding one can be selected. The selection may be performed automatically by a "best matching approach" along with a confirmation by the user that a correct virtual standard implant model was determined, or the selection may be performed manually.

In one embodiment the method further comprises the step of visualizing the superposed dental substructure model and the assembly model. The method may further comprise the step of visualizing the superposed outer surface model with the assembly model. Thus the dental practitioner may be given the opportunity to observe the quality of the superposition. Optionally the method may enable a user input for confirming or skipping the superposition. In case a superposition as performed automatically is skipped the step of superposing may be repeated based on a different basis, for example based on other position of the virtual models to be superposed.

In a further embodiment the fitting quality information is based on a visualization of a cross-section through the inner surface model in combination with a visualization of the dental substructure model in the fit position. The visualization of the cross-section through the inner surface model may obtained by visualizing a combination of the inner surface model and the outer surface model in a semi-transparent or wireframe representation. Further a three-dimensional semi-transparent or wireframe representation of the dental restoration model (composed of the inner and outer surface model) may be visualized in combination with a visualization of the dental substructure model in the fit position. The dental substructure model thereby may be visualized solid, semi-transparent or as cross-section.

In one embodiment the dental substructure is an implant analog, an abutment or a natural tooth stump. A preferred embodiment refers to the dental substructure comprising two, three or more implant analogs. Further the dental restoration may be a dental framework (which is to be veneered to become a final dental restoration) or a finished dental restoration. In particular the dental restoration may be a bridge to be received on at least two implants, abutments, natural tooth stumps and combinations thereof, or a crown to be received on only one implant, abutment or natural tooth stump.

In one embodiment the method further comprises the steps of providing at least part of the shape of a pre-determined implant or abutment in the form of a virtual implant model or virtual abutment model, respectively; and superposing the dental substructure model and the virtual implant model or virtual abutment model. Thus a scanned partial virtual implant model or virtual abutment model may be complemented or replaced by a complete model, for example obtained from a library holding a pre-determined virtual standard implant or abutment model.

In one embodiment the method further comprises the steps of:
determining an axis of insertion of the substructure based on one of the dental substructure model, the implant model or abutment model;
determining an axis of insertion of the dental restoration based on the inner surface model, and
determining an angular and/or positional deviation between the axis of insertion of the substructure and the axis of insertion of the dental restoration.

Any angular and/or positional deviation between the axis of insertion of the substructure and the axis of insertion of the dental restoration may serve as at least part of the fitting quality information.

In one embodiment the method further comprise the steps of:
determining opposing surfaces of the inner surface model and the dental substructure model, respectively; and
determining a three-dimensional spatial relationship of the opposing surfaces.

For example the method may further comprise the step of visualizing the spatial relationship of the opposing surfaces in the form of a false color representation with different colors indicating different distances between the opposing surfaces. For example a three-dimensional distance profile of the distance between the surface of an outer cone present at the dental restoration model and the surface of the corresponding inner cone present at the dental substructure model may be calculated and displayed in the form of a false color representation. This helps a dental practitioner to recognize even minor gaps between the mated contact surfaces (for example cones, planes or any other contact surfaces as for example provided by implant manufacturers).

In a further embodiment the method further comprises one or more of the steps of detecting, locating and measuring a physical deformation of the dental restoration. The measuring may for example performed by the step of determining the three-dimensional spatial relationship of the opposing surfaces determined between opposing surfaces of the inner surface model and the dental substructure model.

Further disclosed is a system for analyzing a positional relationship between a dental restoration and a dental substructure prepared for receiving the dental restoration. The system comprises a scanner and a computer having a visual user interface. The system is configured such that the method of the invention can be performed by use of the system. Accordingly the computer preferably has software for displaying and manipulation three-dimensional models. Further such a computer preferably has software for performing measuring steps between different virtual surfaces, for evaluation of such measuring steps and for displaying the results of such evaluation.

DETAILED DESCRIPTION OF THE INVENTION

The Figures illustrate details of the method of the invention by way of example. It is noted that although certain virtual models are visualized in the Figure for explanation of the invention, the method of the invention may only optionally (or at certain stages different from a respective illustrated stage) visualize such models, for example to a user.

Figure 1:
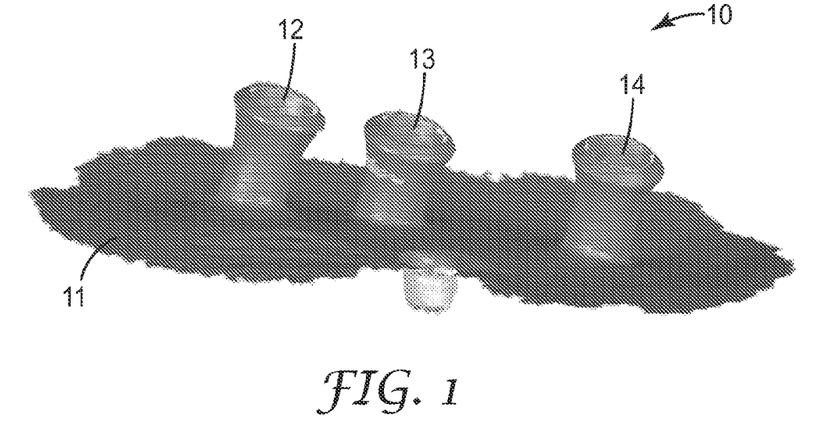
FIG. 1 shows a virtual dental substructure mode according to some embodiments.

FIG. 1 shows a virtual dental substructure model 10. The virtual dental substructure model 10 can be obtained by scanning at least a portion of a patient's dentition. The scanning may be performed directly (intra-orally) in the patient's mouth or (extra-orally) at a physical model of the patient's dentition. Such a physical model may be a dental impression or a plaster model cast from the dental impression. In this regard the dental impression forms a negative physical model and the plaster model forms a positive physical model. To obtain the virtual dental substructure model 10 the intra-oral or extra-oral scanning typically provides computer processible data which represent the shape of the scanned object three-dimensionally. The scan data may be converted, if necessary, for example to invert a scanned negative shape into a positive shape or to enable the scan data to be processed in a computer aided design system.

It is noted that the term "dental substructure" for the purpose of the present specification refers to a physical implant analog, physical abutment or a physical natural tooth stump, whereas the virtual dental substructure model refers to a three-dimensional representation of at least a part of a physical dental substructure including a physical surrounding reference area. In the illustrated example the virtual dental substructure model comprises a virtual reference area 11 and first, second and third virtual models 12, 13, 14 of head portions of implant analogs. The virtual reference area 11 in this example corresponds to a three-dimensional representation of a portion of the patient's gums, but may in another example comprise or correspond to a three-dimensional representation of at least a portion of a natural tooth neighboring the tooth or teeth to be restored.

In the example the head portions of the implant analogs protrude over the patient's gums. Accordingly the head portions of the implant analogs can be directly scanned along with the surrounding reference area. Thus the dental substructure can be scanned in its appropriate positional relationship to the reference area, and thereby a virtual dental substructure model 10 is provided. The example has been chosen for explanation of the invention. However, the skilled person will recognize that in many cases the head portion of an implant analog is located beneath the outer surface of the patient's gums, and thus is partly or entirely invisible and consequently cannot be directly scanned. In such cases a scan body or scan locator (not shown) is typically mounted to the head portion of the implant analog and scanned instead of the implant analog. A scan body typically has an elongated structure to sufficiently protrude over the patient's gums for scanning. Further the scan body typically has a known geometry which is associated with a certain type and shape of the implant analog. From scanning the scan body the position and orientation of the scan body can be determined and based on this the position and orientation of the associated implant analog can be derived. Further, the shape of implant analogs are often provided in the form of computer processible virtual models in a database so that a virtual model of a particular implant analog can be retrieved from that database and virtually arranged within the dental substructure model in its appropriate position and orientation. Accordingly although the head portion of one or more implant analogs may not be directly scannable it is possible to generate a virtual substructure model including a non-scannable head portion by way of derivation from scanning a scan body and retrieving the shape of the corresponding head portion from a database.

Figure 2:
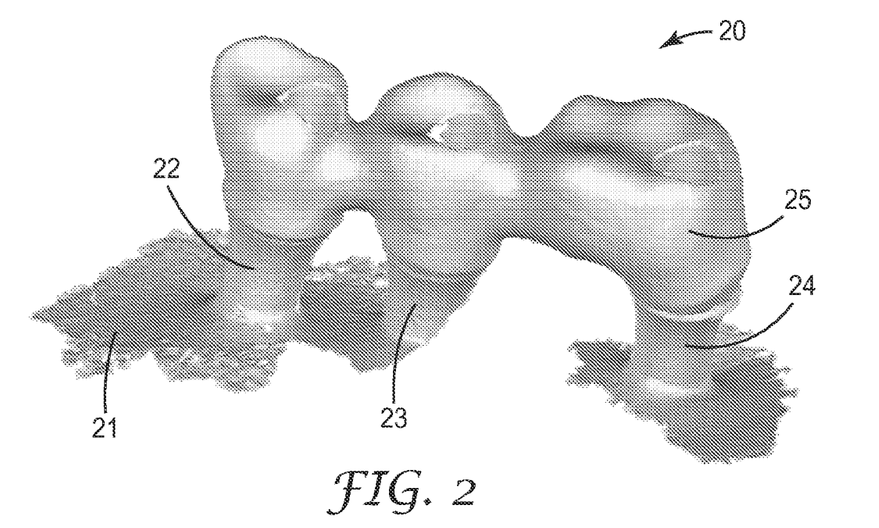
FIG. 2 shows a virtual assembly model obtained from scanning a physical dental restoration, in the example a dental bridge, fitted with or mounted on physical implant analogs according to some embodiments.

FIG. 2 shows a virtual assembly model 20 obtained from scanning a physical dental restoration, in the example a dental bridge, fitted with or mounted on physical implant analogs. The virtual assembly model 20 comprises a virtual reference area 21, first, second and third virtual models 22, 23, 24 of head portions of implant analogs and a virtual model of the dental restoration. The virtual assembly model 20 is based on a scan of substantially the same area as the virtual dental substructure is based on, but in this Figure scanned with the physical dental restoration mounted on the physical analogs. Accordingly a portion of the reference area 11 (in FIG. 1) and a portion of the reference area 21 (in FIG. 2) may generally correspond in shape to each other. In this regard it is noted that tolerances from scanning may result in slight but for the purpose of the invention acceptable differences of the shape of the reference area 11 and reference area 21. Further, portions of the virtual models 12, 13, 14 and 22, 23, 24 are based on scanning the same analogs and therefore generally correspond in shape to each other, respectively. Again certain tolerances from scanning are acceptable for the purpose of the invention. It is noted that the virtual models 22, 23, 24 of the analog head portions are optionally comprised within the virtual assembly model 20 and that in another example the virtual assembly model may only include the reference area 22 and the virtual dental restoration model 25. This is due to the analogs in some instances may not visibly protrude over the outer surface of a patient's gums and thus may not be scannable.

Figure 3A:
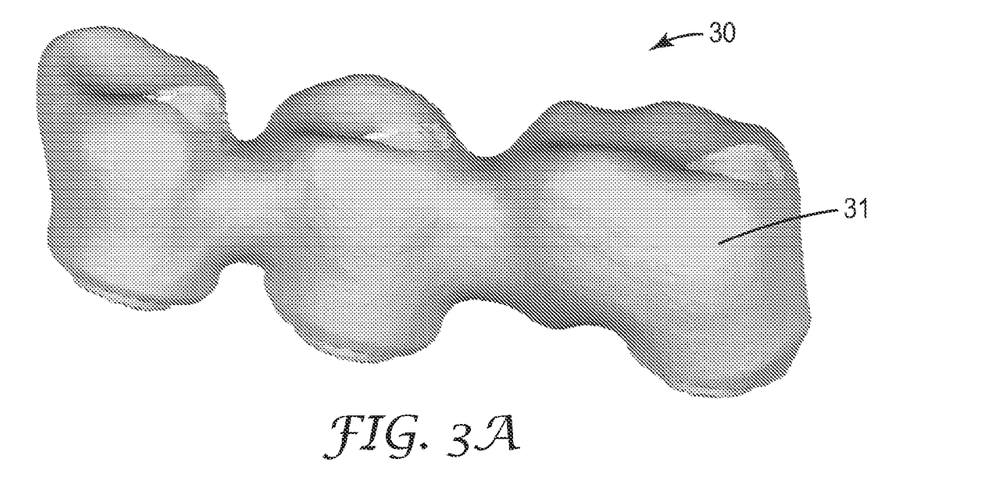
FIG. 3A shows a virtual outer surface model obtained from scanning a physical dental restoration, in the example the dental bridge as referred to at the stage illustrated in FIG. 2 according to some embodiments.

FIG. 3A shows a virtual outer surface model 31 obtained from scanning a physical dental restoration, in the example the dental bridge as referred to at the stage illustrated in FIG. 2. At the stage illustrated in FIG. 3A, however, the dental restoration model 31 is scanned as such, in particular apart or separate from any dental substructure. A dental restoration typically has an inner surface which forms a mechanical interface to a dental substructure on which it is intended to be attached. In particular such inner surface comprises a partial surface which is shaped, eventually accounting for a space needed for a bonding adhesive or cement, to match with a corresponding inverse surface of the dental substructure. Further, the dental restoration typically has an outer surface which is the surface surrounding the inner surface and which, once installed in the patient's mouth, forms part of the exposed or visible surface of the dental restoration. The virtual outer surface model 31 accordingly preferably represents the three-dimensional shape of the outer surface of the dental restoration.

Figure 3B:
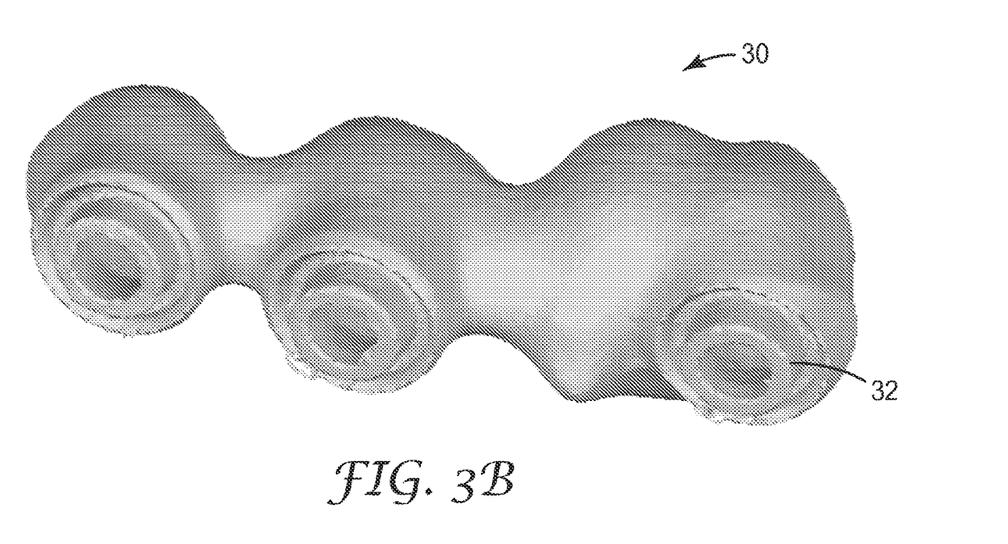
FIG. 3B shows a virtual inner surface model obtained from scanning the same physical dental restoration as referred to at the stage illustrated in FIG. 3A according to some embodiments.

FIG. 3B shows a virtual inner surface model 32 obtained from scanning the same physical dental restoration as referred to at the stage illustrated in FIG. 3A. The virtual outer surface model 31 and the virtual inner surface model 31 are preferably virtually combined or merged to form a common virtual dental restoration model 30. The skilled person will recognize that several scans may be used to provide each of the virtual outer surface model 31 and the virtual inner surface model 31 and to provide a virtual dental restoration model being overall free of surface defects. Further the skilled person will recognize that virtual surfaces obtained from individual scans may overlap, for example some scans may provide portions of both, the virtual inner and outer surface.

Figure 4:
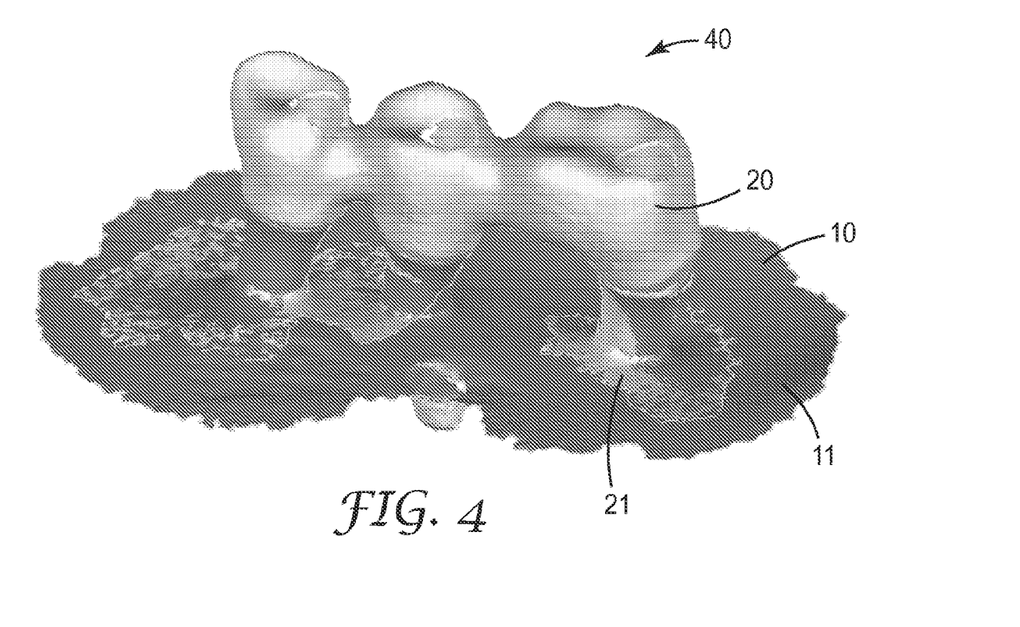
FIG. 4 shows a first virtual superposition obtained from superposing the virtual dental substructure model shown in FIG. 1 and the virtual assembly model shown in FIG. 2 according to some embodiments.

FIG. 4 shows a first virtual superposition 40 obtained from superposing the virtual dental substructure model 10 (shown in FIG. 1) and the virtual assembly model 20 (shown in FIG. 2). The step of superposing is based on matching the respective virtual reference area 11 of the virtual dental substructure model 10 and the virtual reference area 21 of the virtual assembly model 20. Such a matching may be performed visually by a user, for example based on a false color visualization of the virtual dental substructure model 10 (for example visualized in blue) and the virtual assembly model 20 (for example visualize in green) in which the user moves the model until the blue and green color superpose in an appropriate balance. Preferably the matching is however performed by computer aid, by mathematically determining the closest possible distance between the virtual reference area 1l and the virtual reference area 21 and automatically positioning the virtual dental substructure model and the virtual assembly model 20 relative to each other based thereon. Independent from the way of superposing (manually or with the aid of a computer) the first virtual superposition 40 may be visualized (for example displayed of a computer screen) to a user. Thus the user is enabled to check the correct superposition and is provided with the option to interact (for example to repeat any of the previous method steps). By the step of superposing, the positional relationship between the virtual dental substructure model 10 and the virtual assembly model 20 is determined. That positional relationship is subsequently used to align at the virtual dental restoration model 30 (shown in FIG. 3A and FIG. 3B) relative to the virtual substructure model 10 as illustrated in FIG. 5.

Figure 5:
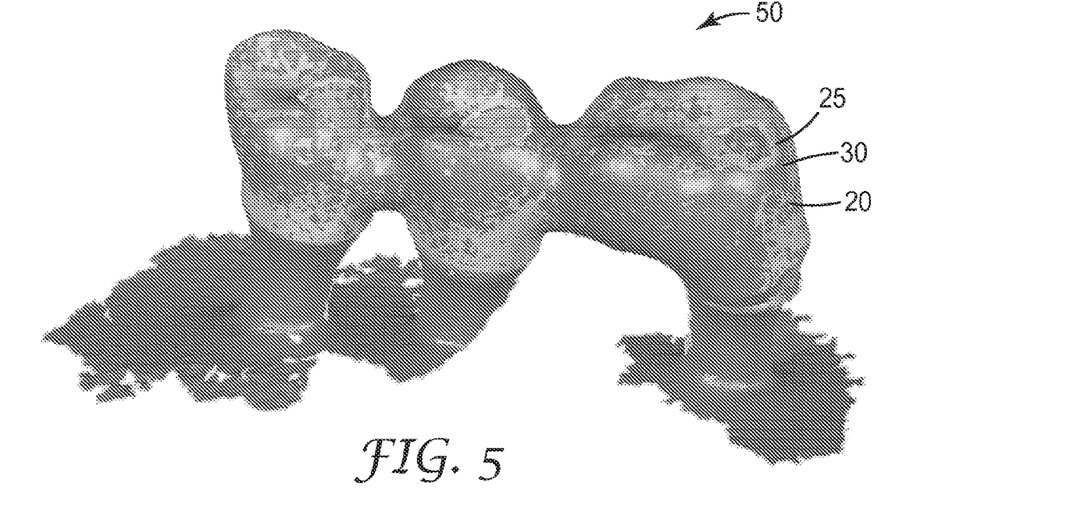
FIG. 5 shows a second virtual superposition which comprises the virtual dental restoration model also shown in FIGS. 3A, 3B and the virtual assembly model also shown in FIG. 2 according to some embodiments.

Accordingly FIG. 5 shows a second virtual superposition 50 which comprises the virtual dental restoration model 30 (also shown in FIGS. 3A, 3B) and the virtual assembly model 20 (also shown in FIG. 2). The dental restoration model 30 is aligned relative to the virtual assembly model 20 by matching based on positional information obtained from the first virtual superposition 40. For example the virtual dental restoration model 30 may be matched with the first virtual superposition 40. This is possible because the first virtual superposition 40 comprises the virtual dental restoration model 25 of the virtual assembly model 20 (FIG. 2) and thus the virtual dental restoration model 30 can be aligned with the virtual dental restoration model 25. The skilled person will recognize that the matching may instead or in addition be performed based on the virtual outer surface model 31. Once the virtual dental restoration model 30 is appropriately aligned relative to the first virtual superposition 40 (shown in FIG. 4) the virtual dental substructure 10 may be aligned in a similar manner as explained in FIG. 6. The skilled person will recognize that the alignment of the virtual dental substructure model 10 and the virtual dental restoration model 30 relative to the virtual assembly model 20 may be performed in any order or simultaneously.

Figure 6:
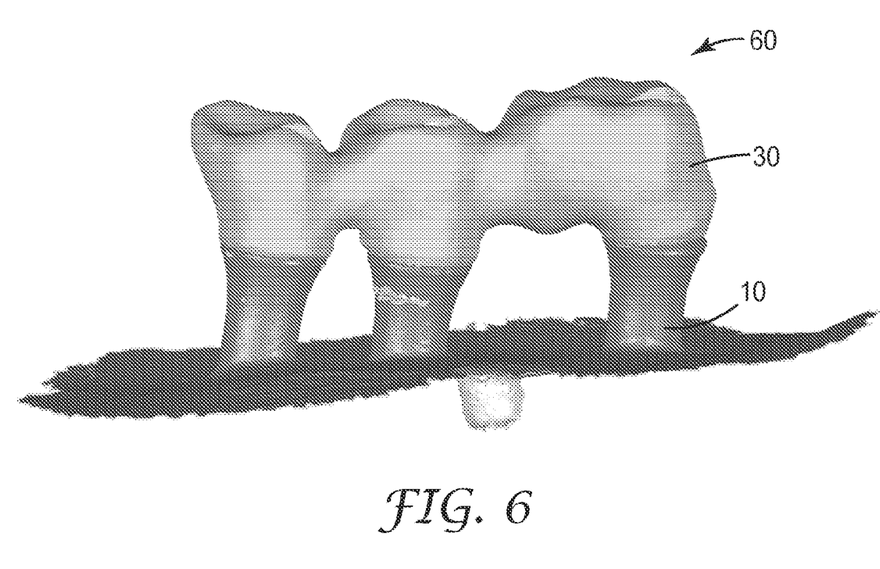
FIG. 6 shows a third virtual superposition which comprises the virtual dental restoration model also shown in FIGS. 3A, 3B and the virtual dental substructure model also shown in FIG. 1 according to some embodiments.

FIG. 6 shows a third virtual superposition 60 which comprises the virtual dental restoration model 30 (also shown in FIGS. 3A, 3B) and the virtual dental substructure model (also shown in FIG. 1). The virtual dental substructure model 10 is aligned relative to the virtual assembly model 20 by matching with the first and/or second virtual superposition 40/50. For example the virtual dental substructure model 10 may be matched with the first and/or second virtual superposition 40/50. This is possible because the first/second virtual superposition 40/50 comprises the virtual models of the implant analogs (22, 23, 24 in FIG. 2) of the virtual assembly model 20 (FIG. 2) and thus the virtual dental substructure model can be aligned with the virtual models of the analogs. The skilled person will recognize that the matching may instead or in addition be performed based on the virtual reference area 21.

The third virtual superposition 60 preferably does not include the virtual assembly model 20, although the virtual assembly model 20 is used to generate the third virtual superposition 60. Accordingly the third virtual superposition 60 comprises the virtual dental restoration model 30 and the virtual dental substructure model 10 in their appropriate positional relationship, and therefore the third virtual superposition 60 represents the shape and position of each of the fitted dental substructure and the dental restoration including their positional relationship to each other in the patient's mouth. The third virtual superposition 60 therefore can be used for analyzing the fit between the fitted dental substructure and the dental restoration.

Figure 7:
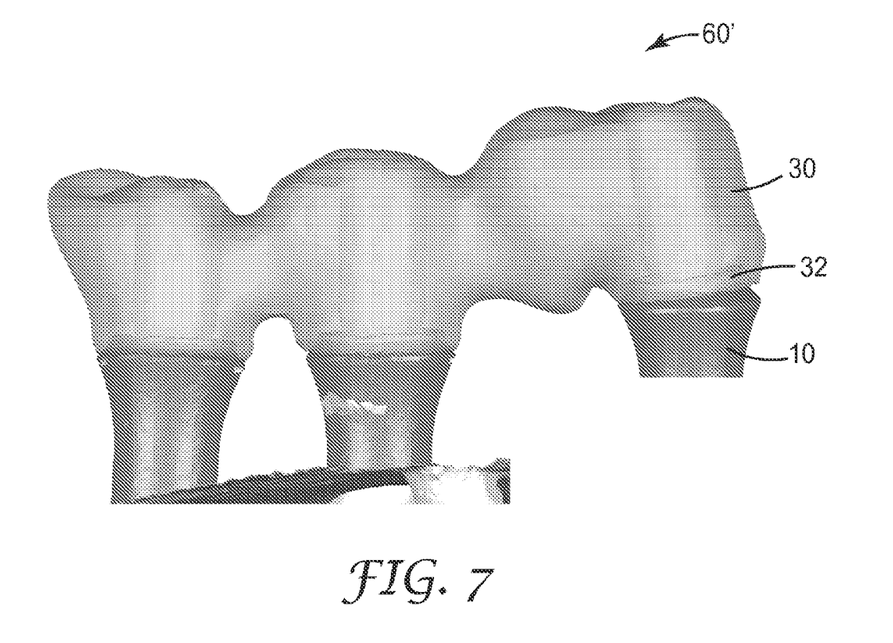
FIG. 7 shows one possibility to provide fitting quality information based on the positional relationship between the virtual dental restoration model and the virtual dental substructure model according to some embodiments.

FIG. 7 shows one possibility to provide fitting quality information based on the positional relationship between the virtual dental restoration model 30 (in particular the virtual inner surface model 32) and the virtual dental substructure model 10. In particular the virtual inner surface model 32 is made visible relative to the virtual dental substructure model 10 to a user, for example by display on a computer screen. In the example shown the visibility is provided by displaying the virtual dental restoration model 30 translucent so that the user is enabled to see boundaries of the virtual inner surface model 32 in relation to boundaries of the virtual dental substructure model 10. The visualization is based on the virtual superposition 60 but with the virtual dental restoration model 30 being translucent to form a modified virtual superposition 60'. The visualization may be in false colors, particularly with the virtual inner surface model 32 and the virtual dental substructure model displayed in different colors (for example green and blue, respectively). Preferably the visualization is such that the user is enabled to three-dimensionally rotate the modified virtual superposition 60'. This allows the user to inspect the fitting (for example contact areas, gaps) between the virtual dental restoration model 30 and the virtual dental substructure model 10.

Figure 8:
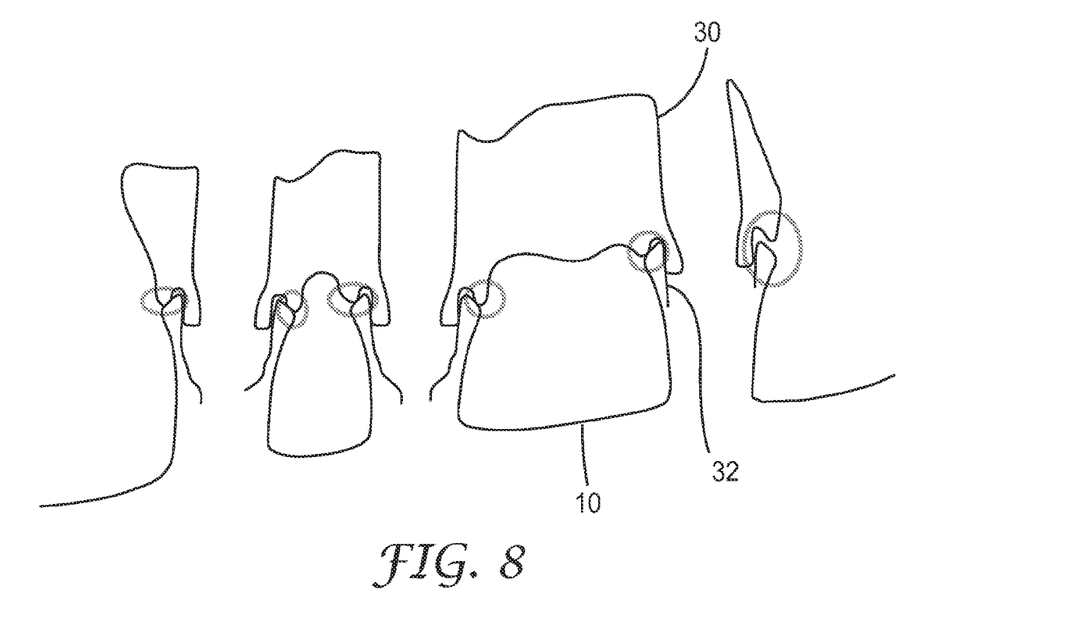
FIG. 8 shows a further possibility to provide fitting quality information based on the positional relationship between the virtual dental restoration model and the virtual dental substructure model according to some embodiments.

FIG. 8 shows a further possibility to provide fitting quality information based on the positional relationship between the virtual dental restoration model 30 and the virtual dental substructure model 10. In this example the virtual inner surface model 32 is visualized relative to the virtual dental substructure model 10 by display of a cross-section along a common plane through the virtual dental restoration model 30 and the virtual dental substructure model 10. The plane along which the cross-section extends preferably can be user-determined. Further any distances between the virtual dental restoration model 30 and the virtual dental substructure model 10, for example in areas of gaps, may be measurable by computer aid.

Figure 9:
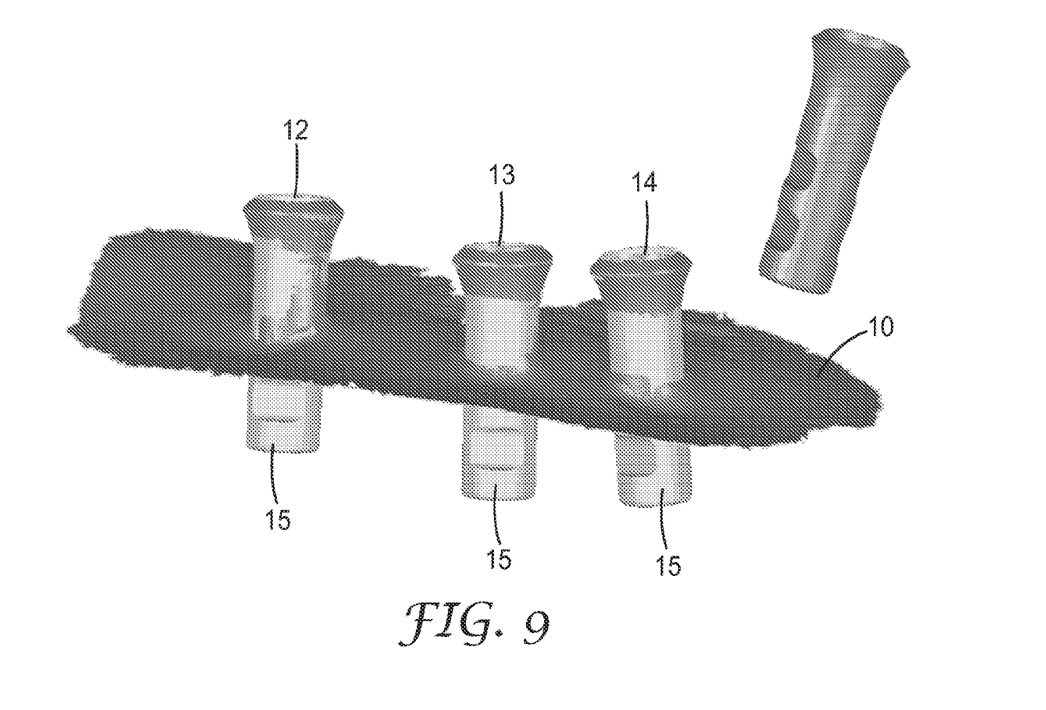
FIG. 9 illustrates a virtual superposition in which the virtual models of the analog head portions of the virtual dental substructure model shown in FIG. 1 are superposed with virtual standard implant models obtained from a library according to some embodiments.

FIG. 9 illustrates a virtual superposition 90 in which the virtual models 12, 13, 14 of the analog head portions of the virtual dental substructure model 10 (FIG. 1) are superposed with virtual standard implant models 15 obtained from a library. This allows for maximizing the accuracy of the virtual dental substructure model 10. This is because the virtual models 12, 13, 14 of the analog head portions typically comprise sufficiently accurate information to accurately match the virtual standard implant models 15 virtual models 12, 13, 14 of the analog head portions, while any virtual surface defects in the virtual models 12, 13, 14 of the analog head portions (for example from scanning) may be replaced by accurate surfaces from the virtual standard implant models 15.

Figure 10:
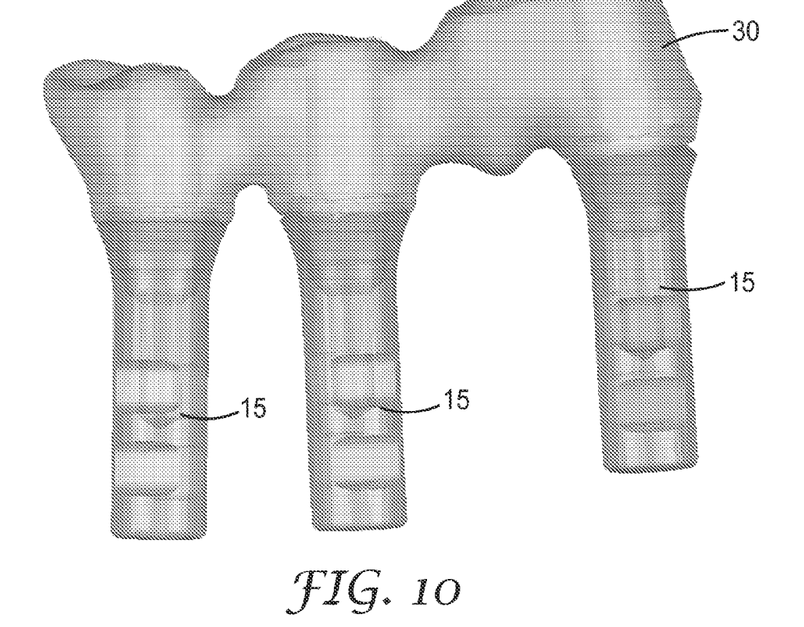
FIG. 10 shows the virtual standard implant models and the virtual dental restoration model according to some embodiments.

The virtual standard implant models 15 and the virtual dental restoration model 30 may further be visualized to a user in their fit position as shown in FIG. 10.

Figure 11:
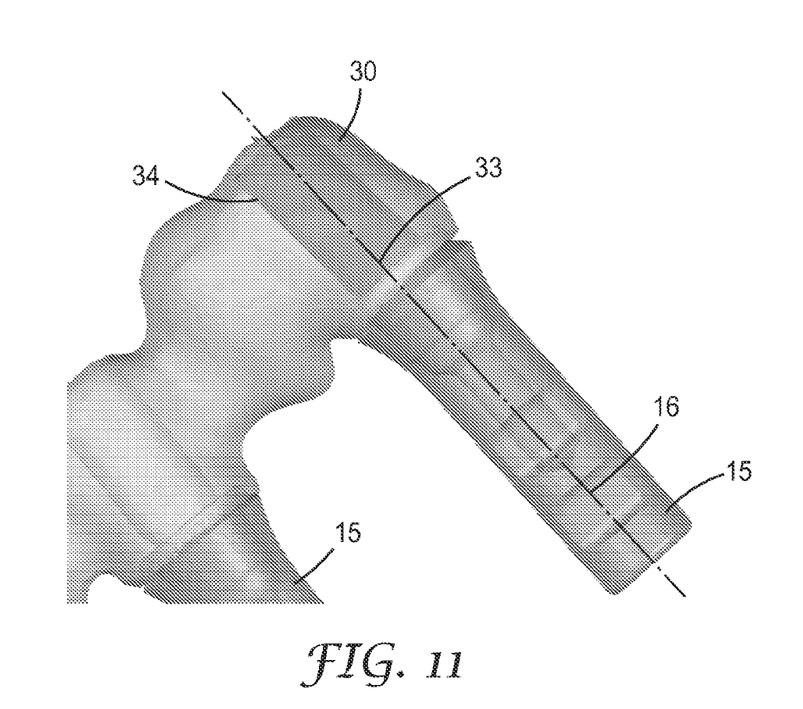
FIG. 11 illustrates the determination of a first axis of insertion and a second axis of insertion according to some embodiments.

FIG. 11 illustrates the determination of a first axis of insertion 16 and a second axis of insertion 33. In the example virtual standard implant models 15 are used so that the first axis of insertion 16 may be derived from the dataset defining the virtual standard implant model 15. For example the dataset may per default comprise data about a center axis of the virtual standard implant model 15 and that center axis may correspond to the first axis of insertion 16. The second axis of insertion 33 may be determined based on the virtual dental restoration model 30. In particular the virtual dental restoration model 30 in the example has a through-hole 34 and the second axis of insertion 33 may correspond to the center axis of that through-hole 34, which may be determined by computer aid. The determination of an axis of symmetry of a three-dimensional model is known in the art of computer aided design, and may for example be based on a statistical approximation. Any angular and/or positional deviation between the first and second axis of insertion 16, 33 may be provided as fitting quality information. Thereby a fewer deviation would indicate a better fit, whereas any greater deviation would indicate worse fit of the dental restoration and the substructure with each other.

What is claimed is:

1. A method of analyzing a positional relationship between a dental restoration and a dental substructure prepared for receiving the dental restoration, the method comprising:
    scanning a reference area including at least a portion of the dental substructure in its positional relationship to the reference area, and thereby providing a virtual dental substructure model;
    scanning the reference area along with scanning at least a portion of the dental restoration fitted with the dental substructure to provide a virtual assembly model;
    providing the shape of at least part of an inner surface and the shape of at least part of an outer surface of the dental restoration in the form of a virtual inner surface model and a virtual outer surface model, respectively, the outer surface to surround the inner surface;
    wherein the inner surface has a concave shape that interfaces and fits over and with a protruding portion of the dental substructure, wherein the dental substructure is an implant, an abutment or a natural tooth stump;
    superposing the virtual dental substructure model and the virtual assembly model based on the reference area;
    superposing the virtual inner surface model and the virtual outer surface model with the virtual assembly model; and
    providing fitting quality information based on a positional relationship between the virtual inner surface model and the virtual dental substructure model.

2. The method of claim 1, wherein the shape of at least part of the inner surface and the shape of at least part of the outer surface of the dental restoration are provided by scanning the dental restoration.

3. The method of claim 1, further comprising the step of visualizing the superposed virtual dental substructure model and the virtual assembly model.

4. The method of claim 1, further comprising the step of visualizing the superposed virtual outer surface model with the virtual assembly model.

5. The method of claim 1, wherein the fitting quality information is based on a visualization of a cross-section through the virtual inner surface model fitted with a visualization of the virtual dental substructure model.

6. The method of claim 5, wherein the visualization of the cross-section through the virtual inner surface model is obtained by visualizing a combination of the virtual inner surface model and the virtual outer surface model in a semi-transparent or wireframe representation.

7. The method of claim 1, further comprising the steps of:
    providing at least part of the shape of a pre-determined implant or abutment in the form of a virtual implant model or virtual abutment model, respectively; and
    superposing the virtual dental substructure model and the virtual implant model or virtual abutment model.

8. The method of claim 7, further comprising the steps of:
    determining an axis of insertion of the substructure by calculation based on data of one of the virtual dental substructure model, the virtual implant model or virtual abutment model; and
    determining, by computing, an axis of insertion of the dental restoration based on the virtual inner surface model, and determining, by statistical approximation, an angular deviation between the axis of insertion of the substructure and the axis of insertion of the dental restoration.

9. The method of claim 1, further comprising the steps of:
    determining, by visualization, opposing surfaces of the virtual inner surface model and the virtual dental substructure model, respectively; and
    determining, by calculation, a three-dimensional spatial relationship of the opposing surfaces.

10. The method of claim 9, further comprising the step of visualizing the spatial relationship of the opposing surfaces in the form of a false color representation with different colors indicating different distances between the opposing surfaces.

11. The method of claim 1, further comprising one or more of the steps of:
    detecting whether there is a physical deformation of the dental restoration;
    locating the physical deformation responsive to detecting the physical deformation; and
    measuring the physical deformation of the restoration.

* * * * *